United States Patent
Ilan

(10) Patent No.: US 12,050,885 B2
(45) Date of Patent: Jul. 30, 2024

(54) ITERATIVE BINARY DIVISION WITH CARRY PREDICTION

(71) Applicant: GSI Technology Inc., Sunnyvale, CA (US)

(72) Inventor: Dan Ilan, Herzliya (IL)

(73) Assignee: GSI Technology Inc., Sunnyvale, CA (US)

( * ) Notice: Subject to any disclaimer, the term of this patent is extended or adjusted under 35 U.S.C. 154(b) by 198 days.

(21) Appl. No.: 17/151,701

(22) Filed: Jan. 19, 2021

(65) Prior Publication Data

US 2021/0263707 A1 Aug. 26, 2021

Related U.S. Application Data

(60) Provisional application No. 63/138,467, filed on Jan. 17, 2021, provisional application No. 62/981,579, filed on Feb. 26, 2020.

(51) Int. Cl.
*G06F 7/535* (2006.01)
*G06F 7/48* (2006.01)

(52) U.S. Cl.
CPC ............ *G06F 7/535* (2013.01); *G06F 7/4824* (2013.01)

(58) Field of Classification Search
CPC ........ G06F 7/535; G06F 7/496; G06F 7/4824; G06F 7/50–5095; G06G 7/16
See application file for complete search history.

(56) References Cited

U.S. PATENT DOCUMENTS

| | | | | |
|---|---|---|---|---|
| 4,320,464 A | * | 3/1982 | Desmonds | G06F 7/535 708/655 |
| 4,761,757 A | * | 8/1988 | Sakai | G06F 7/535 708/650 |
| 9,558,812 B2 | | 1/2017 | Akerib | |
| 9,859,005 B2 | | 1/2018 | Akerib et al. | |
| 10,534,836 B2 | | 1/2020 | Shu et al. | |
| 10,832,746 B2 | | 11/2020 | Akerib et al. | |
| 2004/0179681 A1 | * | 9/2004 | Lee | G06F 7/728 380/30 |
| 2007/0233769 A1 | * | 10/2007 | Moshier | G06F 7/728 708/491 |
| 2016/0239268 A1 | * | 8/2016 | Cho | G06F 7/508 |

OTHER PUBLICATIONS

Hennessy et al., "Computer Organization and Design: The Hardware/Software Interface", Fifth Edition, Chapter 2.2 pp. 63-66 and Chapter 6.3 pp. 509-515, 2014. Retrieved from <https://ict.iitk.ac.in/wp-content/uploads/CS422-Computer-Architecture-ComputerOrganizationAndDesign5thEdition2014.pdf> (Year: 2014).*

* cited by examiner

*Primary Examiner* — Andrew Caldwell
*Assistant Examiner* — Carlo Waje
(74) *Attorney, Agent, or Firm* — HEIDI BRUN ASSOCIATES LTD.

(57) ABSTRACT

A method for binary division includes the steps of having a current remainder provided as a sum bit-vector and a carry bit-vector, performing a carry save add operation between the sum bit-vector and the carry bit-vector and a two's complement representation of a denominator to produce a temporary sum and a temporary carry, predicting a sign bit of a full total of the temporary sum and the temporary carry and updating the remainder with the temporary sum and the temporary carry and incrementing a quotient if the sign bit is 0.

8 Claims, 8 Drawing Sheets

FIG. 1 - PRIOR ART

|       | MSB   |       |       |       |       |       | LSB   |            |
|-------|-------|-------|-------|-------|-------|-------|-------|------------|
| Carry | Bit-6 | Bit-5 | Bit-4 | Bit-3 | Bit-2 | Bit-1 | Bit-0 |            |
| 0     | 0     | 0     | 0     | 0     | 0     | 0     | 0     | S.Sum      |
|       | 1     | 1     | 1     | 0     | 1     | 0     | 1     | S.carry    |
|       | 1     | 1     | 0     | 1     | 0     | 1     | 0     | S.carry<<1 |

FIG. 7A

|       | MSB   |       |       |       |       |       | LSB   |            |
|-------|-------|-------|-------|-------|-------|-------|-------|------------|
| Carry | Bit-6 | Bit-5 | Bit-4 | Bit-3 | Bit-2 | Bit-1 | Bit-0 |            |
| 0     | 0     | 0     | 1     | 1     | 0     | 0     | 0     | S.Sum      |
|       | 0     | 1     | 1     | 0     | 1     | 1     | 1     | S.carry    |
|       | 1     | 1     | 0     | 1     | 1     | 1     | 0     | S.carry<<1 |

FIG. 7B

|       | MSB   |       |       |       |       |       | LSB   |            |
|-------|-------|-------|-------|-------|-------|-------|-------|------------|
| Carry | Bit-6 | Bit-5 | Bit-4 | Bit-3 | Bit-2 | Bit-1 | Bit-0 |            |
| 1     | 1     | 1     | 1     | 1     | 0     | 0     | 0     | S.Sum      |
|       | 0     | 1     | 1     | 0     | 1     | 1     | 1     | S.carry    |
|       | 1     | 1     | 0     | 1     | 1     | 1     | 0     | S.carry<<1 |

FIG. 7C

|       | MSB   |       |       |       |       |       | LSB   |            |
|-------|-------|-------|-------|-------|-------|-------|-------|------------|
| Carry | Bit-6 | Bit-5 | Bit-4 | Bit-3 | Bit-2 | Bit-1 | Bit-0 |            |
| 1     | 1     | 1     | 1     | 0     | 0     | 1     | 0     | S.Sum      |
|       | 0     | 0     | 0     | 1     | 1     | 1     | 1     | S.carry    |
|       | 0     | 0     | 1     | 1     | 1     | 1     | 0     | S.carry<<1 |

FIG. 7D

ITERATIVE BINARY DIVISION WITH CARRY PREDICTION

CROSS-REFERENCE TO RELATED APPLICATIONS

This application claims priority from U.S. provisional patent applications 62/981,579, filed Feb. 26, 2020, and 63/138,467, filed Jan. 17, 2021, both of which are incorporated herein by reference.

FIELD OF THE INVENTION

The present invention relates to associative computation generally and to iterative binary division with carry prediction.

BACKGROUND OF THE INVENTION

Division is the process of calculating the number of times one number, the denominator D, is contained within another number, the numerator N. One of the mathematical notations of a division is expressed by Equation 1:

$$N/D=(Q,R) \qquad \text{Equation 1}$$

Where Q is the quotient, which is the number of times D is contained in N, and R is the remainder R, which is the part of N that remains when in the course of computing Q, no further full chunk of the size of D can be allocated.

Euclidean division is the mathematical formulation of the outcome of the division of integers and may be expressed by Equation 2:

$$N=Q*D+R \qquad \text{Equation 2}$$

where $D \neq 0$ and $0 \leq R < |D|$.

Long division is a method used for dividing large numbers. It breaks the division problem into a sequence of easier steps, where each step includes operations which are illustrated in the procedure illustrated in long division flow 100 of FIG. 1 to which reference is now made.

In step 110, flow 100 starts and receives as input the numerator N and the denominator D. In step 120 a quotient Q and a temporary remainder variable X are initialized to 0, a variable n is initialized to the number of bits of the numerator N and a variable i (that will be used as an indication of the current processed bit of N) is initialized to the location of the most significant bit (MSB) of N (i.e., location n−1), where the computation begins. (It may be noted that the long division process starts in the MSB moving to the right until the last bit—the LSB—is processed). A temporary remainder variable X may be used to compare a current remainder with D during the computation to determine the next step of the flow. In step 130, the temporary remainder X is shifted one place to the left (It may be noted that when a binary number is shifted to the left, a 0 is appended as its LSB and the size of the binary number increases by one.), the value of bit i of N is assigned to the least significant bit (LSB) of X and Q is shifted one place to the left.

In step 140, X is compared with D. If X is smaller than D, then the flow continues with the next bit of N in step 160 (the current remainder is smaller than the denominator therefore the next bit should be handled). On the other hand, if X is equal or larger than D, then the flow continues to step 150 where D is subtracted from X (X−D) and Q is incremented by 1 (setting the value of the LSB of Q to 1) before continuing to step 160.

In step 160, flow 100 may update the value of i to the next location in N in the direction of the LSB (the next bit to the right) by decrementing it by one and in step 170, flow 100 checks whether the latest processed bit is the LSB of N. If the processed bit is not the LSB, flow 100 returns to step 130 to continue processing the next bit in N. If the LSB was processed, the remainder R receives the value of X in step 180, and in step 190, the final values of Q and R are returned as output.

It may be noted that the long division procedure described in flow 100 requires multiple subtraction operations. In fact, the number of the operations needed to complete a long division process is proportional to the size of N. When N is a large number, this may be a fairly long process. It may also be noted that the subtraction operation itself requires carry propagation that is proportional to the size of D. The whole division operation is an increasingly computationally expensive process as D and N get larger and the complexity of the long division method described hereinabove is $O(n*d)$ where n is the number of bits in N and d is the number of bits in D.

SUMMARY OF THE PRESENT INVENTION

There is provided, in accordance with a preferred embodiment of the present invention, an iterative method for binary division dividing an n-bit numerator by a d-bit denominator. The method includes at each iteration the following steps: performing a bit-wise sum and carry operation on a current remainder provided as a sum and a carry and on a two's complement of the denominator, predicting a sign bit of a total of the sum and the carry, updating the current remainder and a bit of a quotient if the sign bit is positive and after all iterations are finished, creating a final remainder from a total of the sum and carry of the current remainder of a last iteration.

There is also provided, in accordance with a preferred embodiment of the present invention, a method for binary division. The method includes the following steps: having a current remainder provided as a sum bit-vector and a carry bit-vector, performing a carry save add operation between the sum bit-vector and the carry bit-vector and a two's complement representation of a denominator to produce a temporary sum and a temporary carry, predicting a sign bit of a full total of the temporary sum and the temporary carry and updating the current remainder with the temporary sum and the temporary carry and incrementing a quotient if the sign bit is 0.

Additionally, in accordance with a preferred embodiment of the present invention, the method also includes having an index pointing to a most significant bit (MSB) of a numerator, setting a least significant bit (LSB) of the sum bit vector to a value of a bit in a location index of the numerator, decreasing the index and repeating the steps of having, performing, predicting, updating, and decreasing until the index is pointing to an LSB of the numerator, and creating a final remainder by adding the temporary sum and the temporary carry.

Furthermore, in accordance with a preferred embodiment of the present invention, the performing step of the carry save add operation is done concurrently on all bits of the bit-vectors.

Moreover, in accordance with a preferred embodiment of the present invention, the predicting step includes the steps of finding a first sum sequence of '1's in the temporary sum, shifting the temporary carry one location to the left, finding a first carry sequence of '1's in the temporary carry, and predicting a carry if the first sum sequence overlaps the first carry sequence.

There is provided, in accordance with a preferred embodiment of the present invention, a method to compare between a first number and a second number, the method includes the steps of storing the first number in a first row of an associative memory array, storing a two's complement representation of the second number in a second row of the associative memory array such that bit i of the second number is stored in a same column of the associative memory array as bit i of the first number, concurrently performing a carry save operation on a plurality of columns of the associative memory array to create a sum and a carry, predicting a value of a carry out bit without adding the sum and the carry, and indicating that the first number is smaller than the second number if the value of the carry out bit is 1.

There is provided, in accordance with a preferred embodiment of the present invention a long divider system. The system includes a carry save calculator to receive a remainder in a form of a sum vector and a carry vector, and perform a carry save add operation between the remainder and a ones' complement representation of a denominator vector to create a temporary sum and a temporary carry. The system also includes a carry predictor to predict a sign of a sum of the temporary sum and the temporary carry and to increment a quotient if the sign is 0, and a full adder to add the temporary sum and the temporary carry to create a final remainder after all bits of a numerator have been processed.

Additionally, in accordance with a preferred embodiment of the present invention, the system also includes an associative memory array to store the sum vector the carry vector, the remainder, the ones' complement representation of a denominator vector, the temporary sum and the temporary carry in rows of the memory array such that each bit i of the vectors are stored in a column i of the memory array.

Furthermore, the carry save calculator concurrently activates rows and columns storing bits of the sum vector, the carry vector and the remainder, thereby concurrently compute a plurality of bits including the temporary sum and the temporary carry in a computation complexity of O(1).

Still further, the carry predictor concurrently activates rows storing bits of the temporary sum and the temporary carry and a plurality of columns storing the bits thereby predicts a sign of a total of the temporary sum and the temporary carry in a complexity of O(1).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 7A, 7B, 7C and 7D illustrate various cases handled by the flow of FIG. 6.

Figure 1:
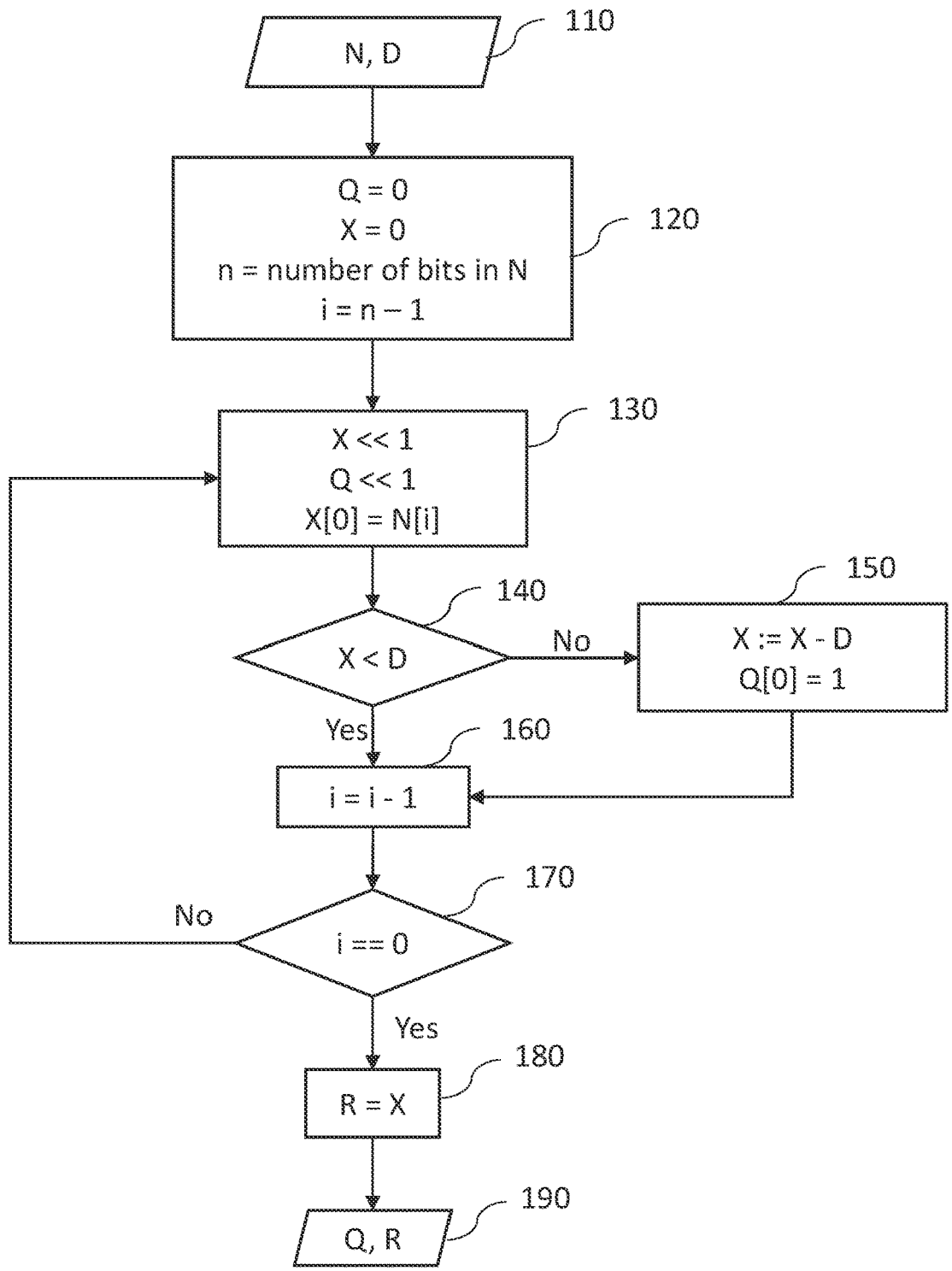
FIG. 1 is a schematic illustration of a state-of-the-art long division algorithm for dividing binary numbers.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 2:
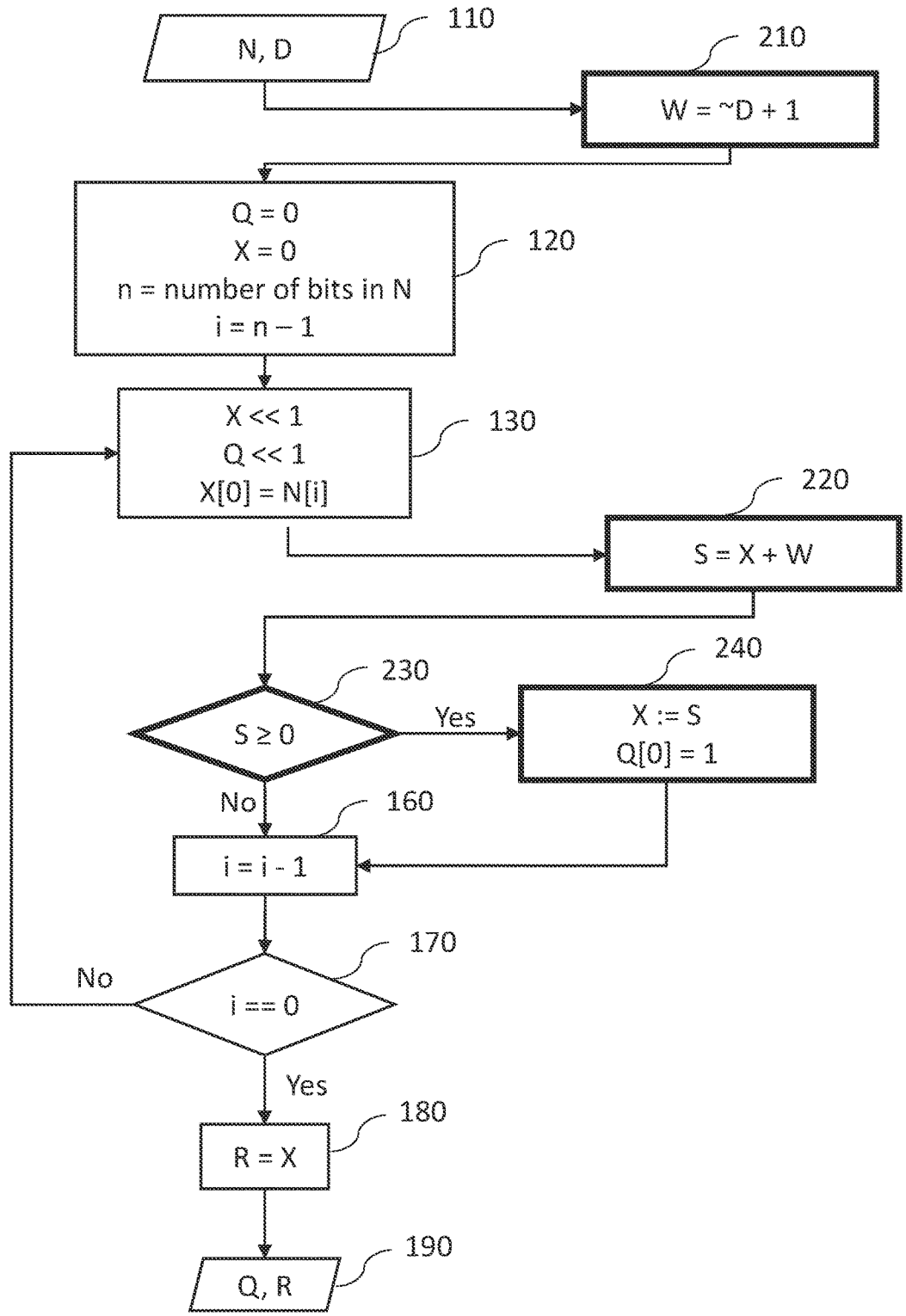
FIG. 2 is a schematic illustration of an alternative algorithm for long division binary numbers replacing the step of subtracting the denominator by a step of adding the two's complement of the denominator, operative in accordance with an embodiment of the present invention.

Applicant has realized that the long division algorithm may be implemented by replacing the subtraction operation of D by an addition operation of the inverse value of D (−D) as illustrated in flow 200 of FIG. 2 to which reference is now made. Applicant has also realized that using the two's complement representation of −D can be easily implemented on an associative processor unit (APU) for long integers (of thousands of bits) and may improve the computation significantly using the APU's massive parallel data processing features.

Steps of flow 200 that are identical to steps of flow 100 share the same reference numerals. In step 110, flow 200 may receive as input the numerator N and the denominator D. and may create, in step 210, the value of the two's complement representation of −D (referred to here as W and computed by adding 1 to the one's complement representation of D) and, in step 120, may initialize a temporary remainder variable X to 0, a variable n to the number of bits of the numerator N and a variable i (that will be used as an indication of the current processed bit of N) to the location of the most significant bit (MSB) of N where the computation begins. In step 130, flow 200 may perform a shift left operation on X and Q and may set the value of the LSB (least significant bit) of X to the current bit of N.

In step 220, flow 200 may compute the sum S of W and X (S=X+W) and in step 230, flow 200 may determine if the sum S is positive. If S is positive, flow 200 continues to step 240 and may set the value of X to S and the LSB of Q to '1' (Q is incremented by 1). The rest of flow 200 (steps 160, 170, 180, 190) may operate in a manner similar to that done in the respective steps in flow 100 (updating the number of remaining bits, determining whether the process is completed and if so, assigning the value of R to the value of X and returning the final values of Q and R as output).

Applicant has realized that using W (the two's complement representation of –D) during the division process on an associative memory device such as the device described in U.S. Pat. Nos. 9,558,812, and 10,832,746 incorporated herein by reference and assigned to the common assignee of the present invention, as well as using a full adder, such as the one described in U.S. Pat. No. 10,534,836, incorporated herein by reference and assigned to the common assignee of the present invention, may significantly reduce the complexity of the overall long division operation.

It may be noted that in the two's complement representation, the MSB is a sign bit. Additionally, the two's complement value of any binary number may be easily computed by adding the value of 1 to the ones' complement value of the binary number (inversing the bits of the binary number and adding 1 to the outcome).

Applicant has also realized that the actual value of the sum is not really needed during the long division computation but only at the end of it, while during the computation, the only required fact is whether the sum is positive or negative, which is reflected in the value of a carry bit (it may be noted that a carry bit may be created when adding bits of two binary numbers in addition to a sum bit when the sum of the two bits is larger than 1).

Figure 3:
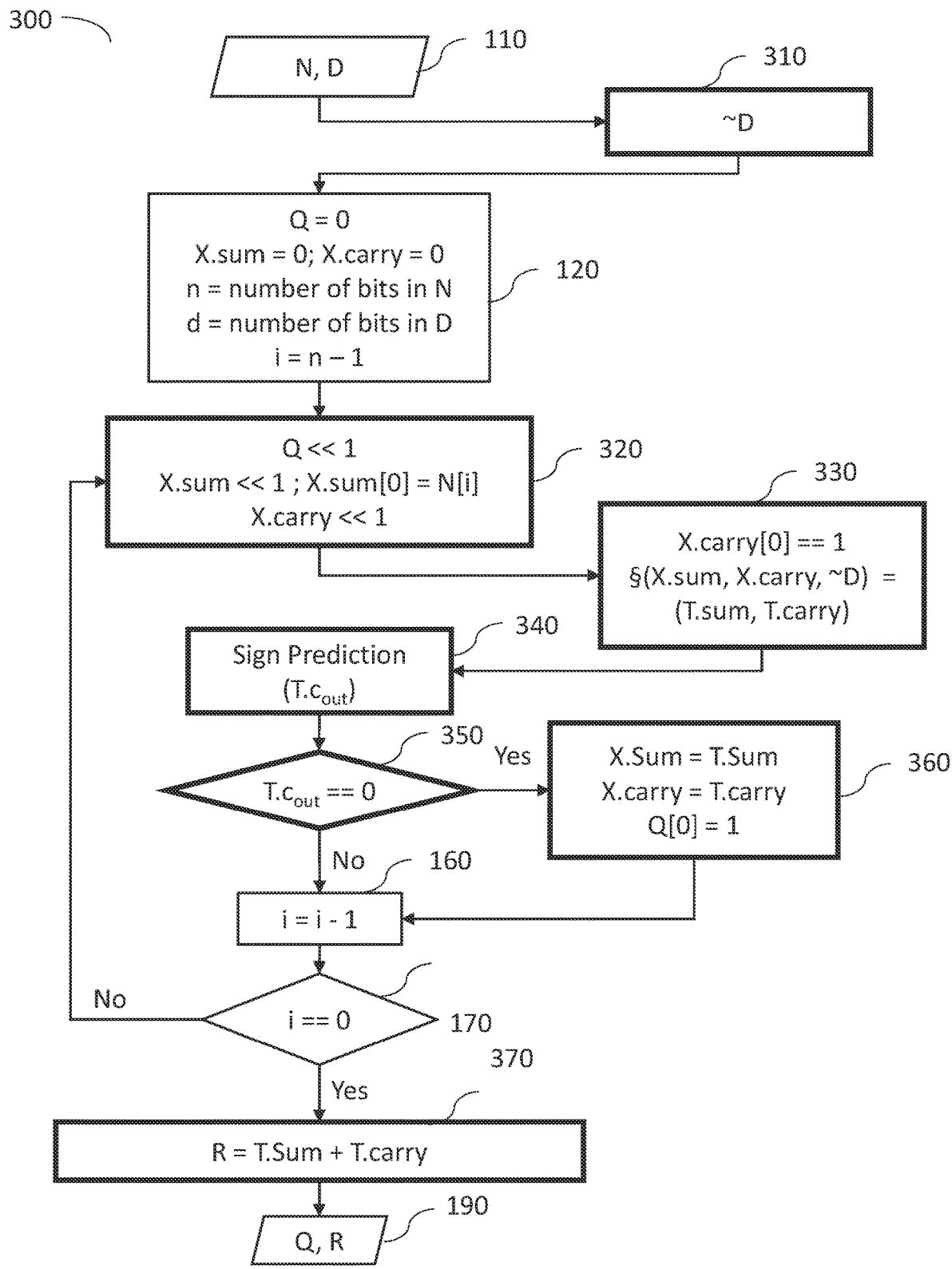
FIG. 3 is a schematic illustration of an enhanced alternative algorithm for long division binary numbers replacing the step of adding the twos complement by predicting the sign of the sum, operative in accordance with an embodiment of the present invention.

FIG. 3, to which reference is now made, illustrates a flow 300 implemented by a long divider 400 of FIG. 4 described in detail herein below. It may be noted that steps shared between flow 300 and flow 100 (FIG. 1) of the prior art share the same reference numerals while the new steps (320, 330, 340, 350, 360 and 370) are emphasized by a bold outline.

In step 110 of flow 300, long divider 400 may receive two unsigned integers N and D as input. In step 310, long divider 400 may inverse the bits of D and may create the ones' complement value of D (which is the first step of converting D to its two's complement representation). In step 120, long divider 400 may initialize several bit-vectors and several scalars. The initialized vectors may include Q, which is the bit-vector containing the quotient, and temporary vectors X.sum and X.carry, which may be used when comparing the remainder to D. X.sum may be a temporary bit-vector containing an intermediate sum computed without carry propagation and X.carry may be a temporary bit-vector containing an intermediate carry. The scalars may be n, which is the number of bits in N, d, which is the number of bits in D, and an index i which initially points to the MSB of N (i.e., the n–$1^{th}$ bit) and may be decremented after each step in the division performed by long divider 400 to point to the next location in N where the flow should continue.

In step 320, long divider 400 may perform a left shift operation on X.sum and on X.carry and may set the LSB of X.sum[0] to the value of N[i], i.e. may progress to the next bit.

As mentioned herein above, the two's complement representation of D may be computed by adding 1 to the ones' complement of D. It may be noted that the two's complement representation of D may be created in two steps in flow 300. The first, creating the ones' complement representation, may be done in one step (step 310) and the second, adding 1 to the outcome, may be done by another step (step 330).

As indicated herein above, the ones' complement of D was created in step 310. To complete the creation of the two's complement representation of D, long divider 400 may add 1 to a vector participating in an "add" operation with the inverse of D (instead of adding it to the inverse of D directly) and in step 330, long divider 400 may complete the creation of the two's complement representation of D by adding 1 to the X.carry bit-vector (setting its LSB to 1). Long divider 400 may then perform a bit wise sum and carry operation between X.sum, X.carry and ~D resulting in a temporary bit-vector T.sum containing the bit wise sum and a temporary bit-vector T.carry containing the bit wise carry. It may be noted that the symbol § (bit-vector, bit-vector, bit-vector) represents the bit wise sum and carry operation in this application.

In step 340, long divider 400 may predict the sign of the sum (i.e. the value of the carry out bit $T.c_{out}$—that may be created when adding T.sum and T.carry) of T.sum and T.carry without actual computing it via a carry propagation. In step 340, the actual sum is not calculated, only the value of the carry out bit, which may be the sign bit, may be predicted.

In step 350, long divider 400 may check if the value of the predicted carry $T.c_{out}$ equals 0 (i.e. whether the predicted sum of T.sum and T.carry is positive).

When the sum is positive, flow 300 may continue to step 360 where long divider 400 may assign the values of T.sum to X.sum and T.carry to X.carry and may increment the value of Q (by setting the value of its LSB to 1). When the sum is negative, flow 300 may continue to step 160 where long divider 400 may progress to the next bit, by reducing the index i by 1.

In step 170, long divider 400 may check if the last bit of N (the LSB) was reached. If the computation is not finished (the handled bit is not the LSB of N), long divider 400 may return to step 320 and may continue processing the next bit. If the computation is completed, long divider 400 may continue to step 370 where full adder 450 may compute the value of R as the final sum of T.sum and T.carry and may provide Q and R as output in step 190.

It may be appreciated that associative memory array 410 may store very large binary numbers with thousands of bit (e.g. 2K, 4K) and, despite this, the complexity of each step of flow 300, including steps 310, 330 and 340 may be performed in a complexity of O(1) as per step, all of the computations may be performed concurrently on all bits of all bit-vectors.

Figure 4:
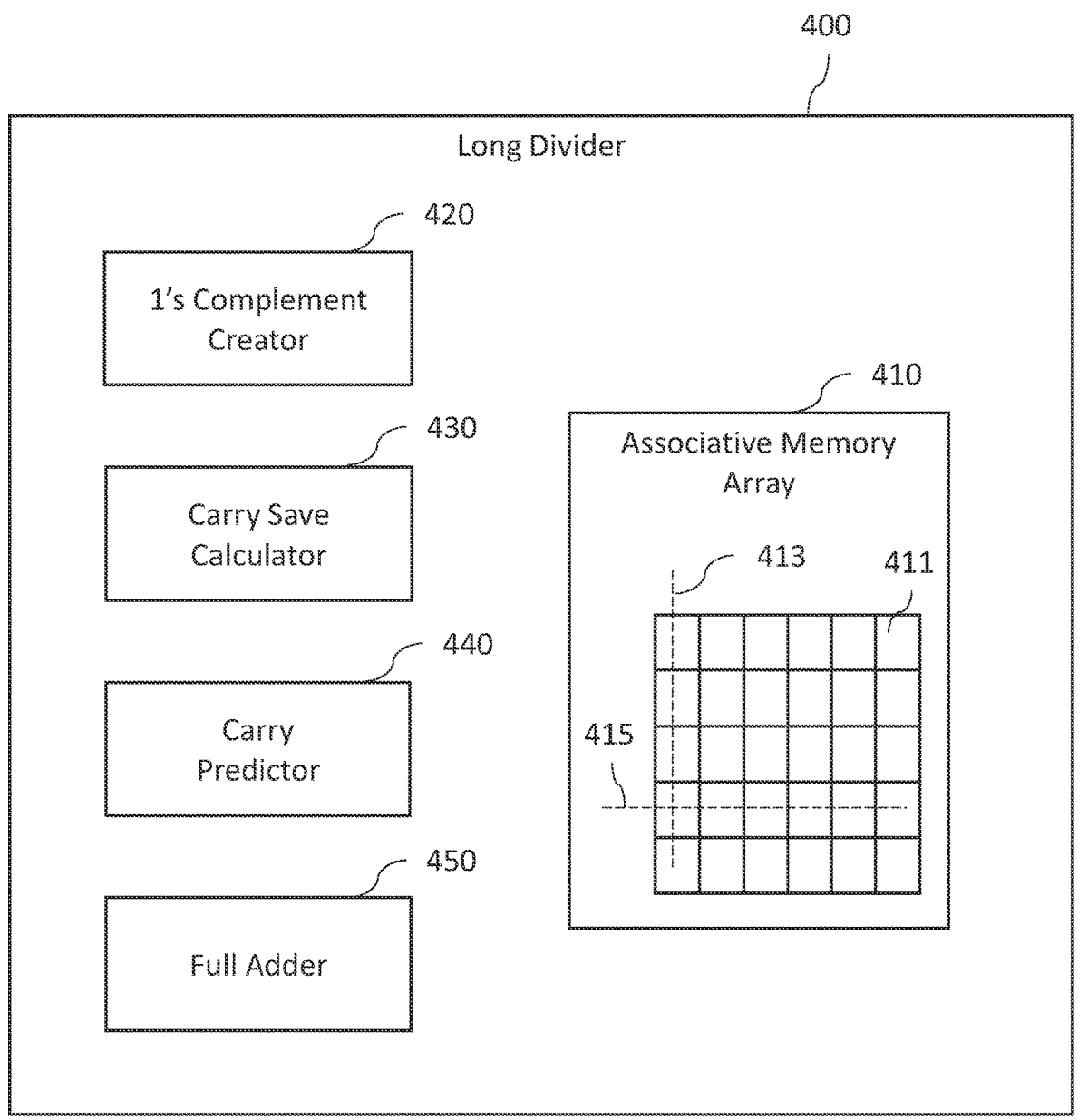
FIG. 4 is a schematic illustration of a long divider system, constructed and operative in accordance with an embodiment of the present invention.

FIG. 4, to which reference is now made, is a schematic illustration of a long divider 400, constructed and operative in accordance with an embodiment of the present invention. Long divider 400 may comprise an associative memory array 410, a ones' complement creator 420, a carry save calculator 430, a carry predictor 440 and a full adder 450.

Associative memory array 410 comprises a plurality of cells 411 arranged in a matrix having bit lines 413 (columns) and word lines 415 (rows). All cells 411 in the same column are connected to the same bit line 413 and all cells 411 in the same row are connected to the same word line 415.

Ones' complement creator 420 may receive any bit-vector (e.g., D), stored in a row of associative memory array 410 (i.e., in a word line) and may create a ones' complement representation of the received vector by inverting each bit in the bit vector and storing the ones' complement of the vector in a row of associative memory array 410.

Carry save calculator 430 may receive any 3 bit-vectors as input (e.g. X.sum, X.carry and ~D) and may perform a bit wise sum and carry operation that creates as output two bit-vectors, a sum bit-vector (e.g. T.sum,) and a carry out bit-vector (e.g. T.carry).

It may be noted that each bit vector (X.sum, X.carry and ~D) may be stored in a separate row of associative memory array 410. It may also be noted that bit j of each bit vector may be located in the same column (j) of associative memory array 410 and thus, may be connected by the same bit line, enabling a concurrent computation of the sum and carry on all bits of the bit vectors, thus calculating the sum and carry vectors in a complexity of O(1). A description of the placement of the various vectors in associative memory array 410 is detailed with respect to FIG. 5 herein below.

Carry predictor 440 may predict the sign of the sum of two bit-vectors without performing the addition operation and calculating the actual sum of the two vectors. Carry predictor 440 may predict the sign of the sum by looking for a sequence of 1's in one of the vectors starting from the MSB (a single '1' is considered a sequence). If no such sequence could be found, the predicted sign is 0. If a sequence of ones has been found, carry predictor 440 may look for '1' in any location along the corresponding portion in the second vector after it has been shifted one place to the left. If at least one instance of '1' was found in the second shifted vector, the predicted sign is 1, otherwise the predicted sign is 0.

Carry predictor 440, described in more detailed with respect to FIG. 8 herein below, may use a find first set (FFS) function implemented on associative memory array 410 to locate the first appearance of the value "1" in a row of memory array 410. The FFS may perform a XOR operation between each cell in a row and the cell located to its right (on the same row). The FFS logic may set the value of all bits to the right of the first occurrence of '1 to '0' keeping only the first location where the sequence of '1' starts.

Full adder 450 may receive three bit-vectors as input, may compute the sum of the vectors using carry propagation, and may return a bit-vector with the sum and one carry bit.

Figure 5:
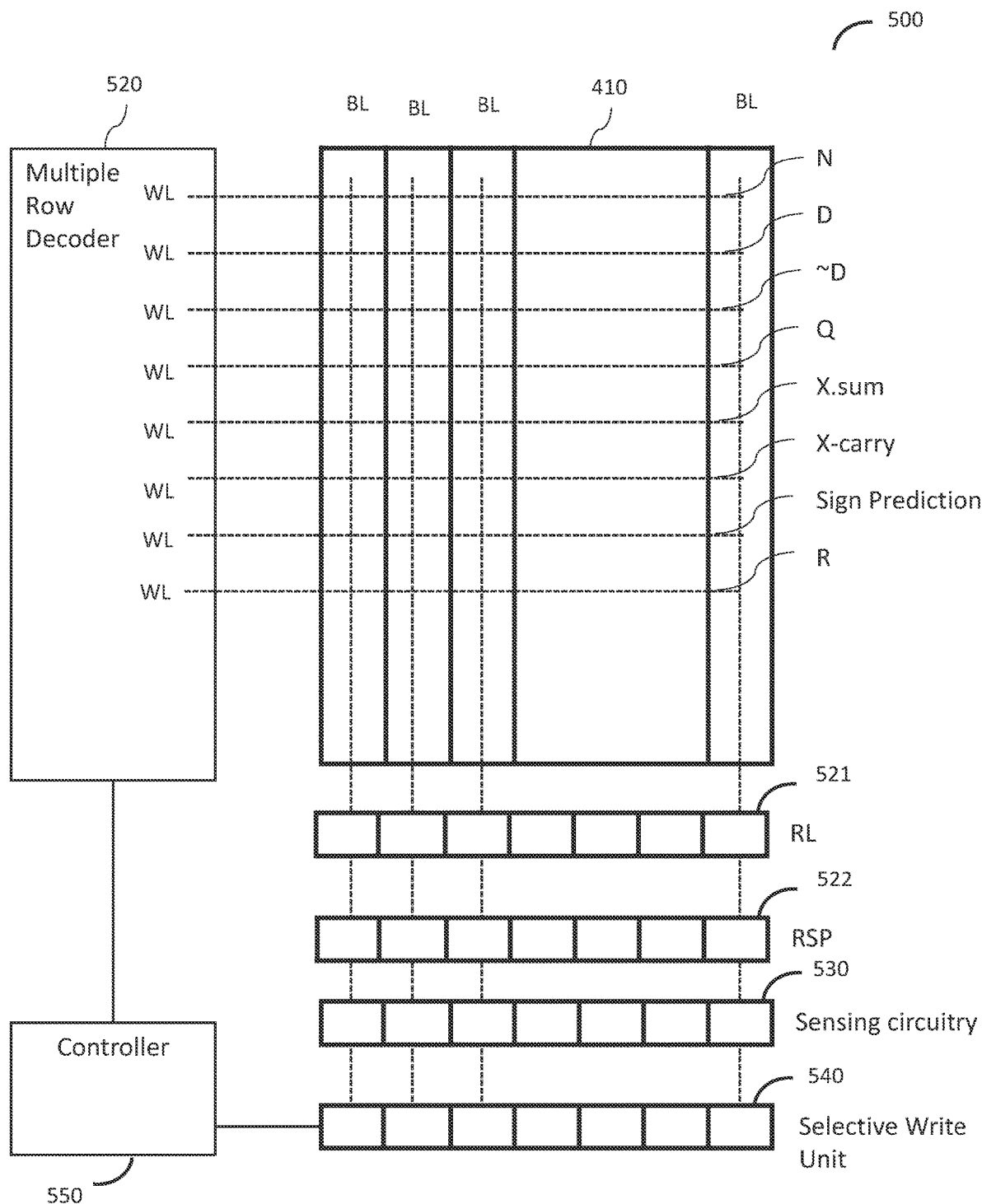
FIG. 5 is a schematic illustration of an associative memory device implementing the functionality of long divider system of FIG. 4, constructed and operative in accordance with an embodiment of the present invention.

FIG. 5, to which reference is now made, illustrates an associative memory device 500 implementing the functionality of long divider 400. Associative memory device 500 comprises associative memory array 410, a multiple row decoder 520, an RL 521, an RSP 522, a sensing circuitry 530, a selective write unit 540 and a controller 550.

Associative memory array 410 may be any suitable memory array, volatile or non-volatile, destructive, or non-destructive and may comprise pure memory cells. Data including input, intermediate results and output may be stored in rows of associative memory array 410. Rows marked as N and D may store the input numbers, rows marked as Q and R may store the output numbers and other rows may store intermediate data and additional data items used throughout the computation, such as X.sum and X.carry, the index of the MSB of N and D and the like. Additional rows (not illustrated in the drawing) may be used for temporary computation and storage. The allocation of rows in associative memory array 410 is not specified and the order of rows in FIG. 5 is used for illustrative purposes only.

Multiple row decoder 520 may be any suitable row decoder capable of concurrently activating a plurality of rows. Row decoder 520 may activate two or more rows of associative memory array 410 at a time. When multiple rows are activated, all columns of associative memory array 410 may be activated at the same time, providing concurrent computation on all columns of associative memory array 410 for the activated rows when a read operation is performed, and providing a concurrent write operation when a write operation is performed.

RL 521 may read a row from associative memory array 410 and perform various logical operations between cells in the row (OR, XOR and the like). It may be noted that the RL functionality operates on the row level and provides row level computation while column level logical operation may be provided by associative memory array 410).

RSP 522 may return an indication whether at least one cell in a row has the value 1. The RSP operation may be performed on any activated row of associative memory array 410 and may be based on U.S. Pat. No. 9,859,005, assigned to the common assignee of the present invention.

Sensing circuitry 530 may be formed of any suitable sensing circuitry and may be capable of sensing the value on any bit-line connecting cells of a column and may provide the result of a Boolean function performed between selected cells of each column.

Selective write unit 540 may select which sensed columns to write back to associative memory array 410 and may be capable of writing the value from a plurality of sensing circuitry components concurrently.

Controller 550 may indicate to multiple row decoder 520 which rows to activate for the current operation, read or write, and may also indicate to selective write unit 540 from which columns to write the output of sensing circuitry 530 back into associative memory array 410 and the rows to which the data may be written in a selective write operation. Controller 550 may comprise various parts of long divider 400 such as ones' complement creator 420, carry save calculator 430, carry predictor 440 and full adder 450.

It may be appreciated that the computations may occur within the associative memory array, as a result of the multi read operation. Thus, associative memory device 500 may implement concurrently any Boolean operation, on all the columns of associative array 410, resulting in a massive, in place, parallel computation. Long divider 400 may be part of controller 550 that controls the activations of rows and columns of associative memory array 410 according to flow 300.

Figure 6:
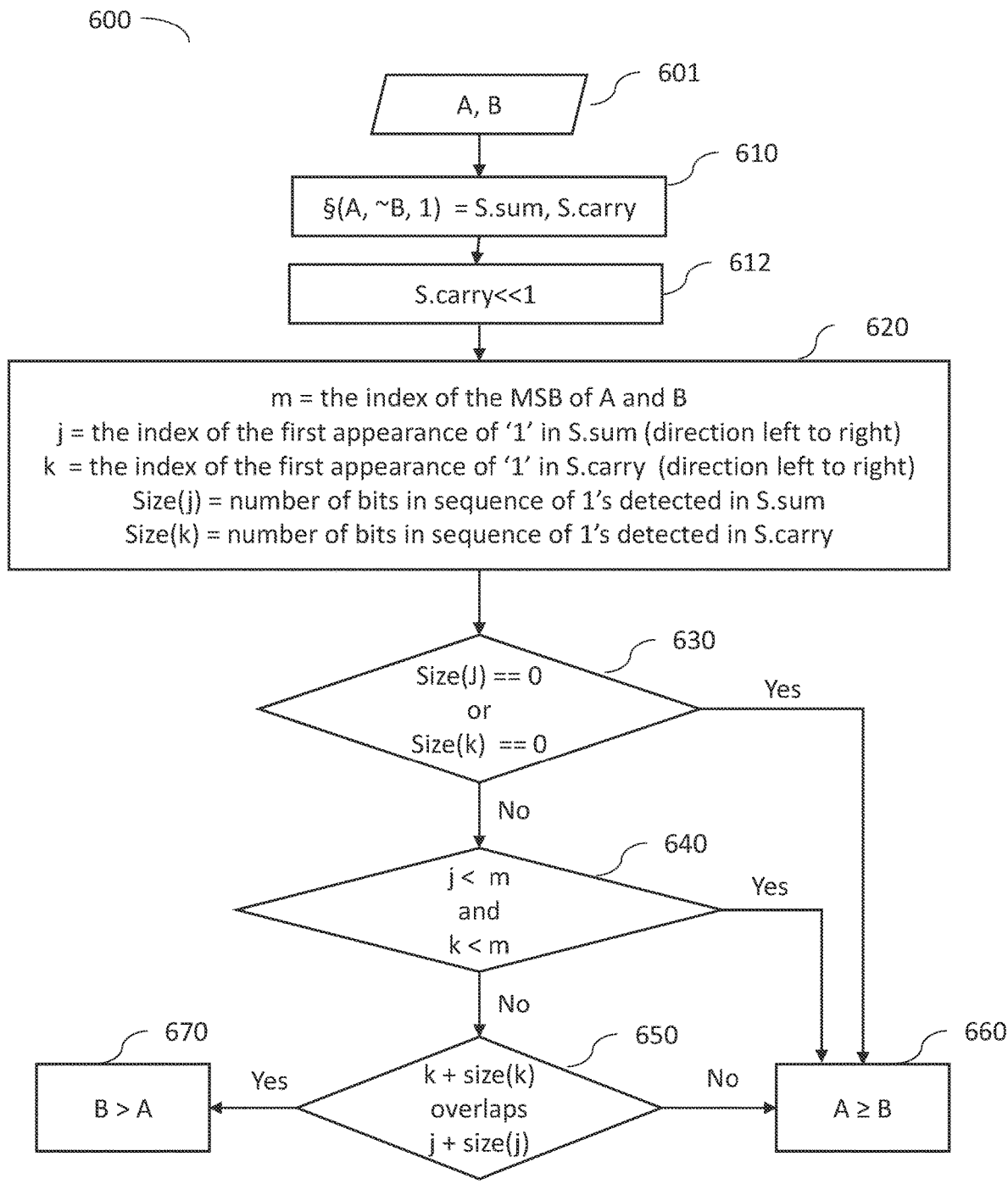
FIG. 6 is a schematic illustration of a flow for comparing numbers, operative in accordance with an embodiment of the present invention, that may be executed by long divider system of FIG. 4.

FIG. 6, to which reference is now made, is a schematic illustration of a flow 600 that may be executed by long divider 400 to compare between two numbers, such as to determine if a result is positive or negative as is done in step 350.

In step 601, flow 600 may receive any two numbers A and B to compare and determine which one is bigger. In step 610, flow 600 may perform a carry save operation between A, ~B and 1 to produce an S.sum bit-vector and an S.carry bit-vector. It may be noted that the operands ~B and 1 in the carry save operation produce the two's complement representation of B which is like subtracting B from A. In step 612, flow 600 may perform a shift left operation on S.carry.

In step 620, the index of the MSB may be detected (A and B may be stored in vectors of the same size and a '0' is appended to the left of the shorter value). The index of the first occurrence of '1' in each vector S.sum and S.carry is assigned to j and k respectively and the size of the detected sequences of '1's in each vector is assigned to size(k) and size(j) respectively.

In step 630, the size of the sequences is evaluated. If either size(j) or size(k) equals 0, then there is no chance of propagating a carry and therefore the flow continues to step 660, determining that A≥B.

In step 640, the location of both sequences is evaluated. If the location of both vectors does not overlap the location of the MSB, then even if there will be a carry, it will not propagate over the MSB and therefore the flow continues to step 660, determining that A≥B.

In step 650 (at least one sequence starts at the MSB of one of the vectors), the location of the sequences of both vectors are evaluated. If the sequences do not overlap, there will be no carry propagation over the MSB and therefore the flow continues to step 660, determining that A≥B. If, on the other hand, the sequences do overlap, a carry will be propagated over the MSB and the flow continues to step 670, determining that A<B.

It may be appreciated that flow 600 may be used by carry predictor 440 to predict that the carry may be 0 when A≥B and 1 when A<B.

FIGS. 7A, 7B, 7C and 7D, to which reference is now made, illustrate various cases handled by flow 600. FIG. 7A provides an example handled by step 630 where S.Sum has all zeros. Thus, the size of the sequence of 1's in S.sum is zero, indicating that there will not be a carry propagation. FIG. 7B provides an example handled by step 640 where the sequences of 1's in both S.Sum and S.Carry do not start in the MSB, indicating there will not be a carry propagation. FIG. 7C provides an example handled by step 650 where the sequences of 1's in S.sum and S.carry overlap, indicating that there will be a carry, and FIG. 7D provides an example handled by step 612 in conjunction with step 640 indicating that there will be a carry.

Figure 8:
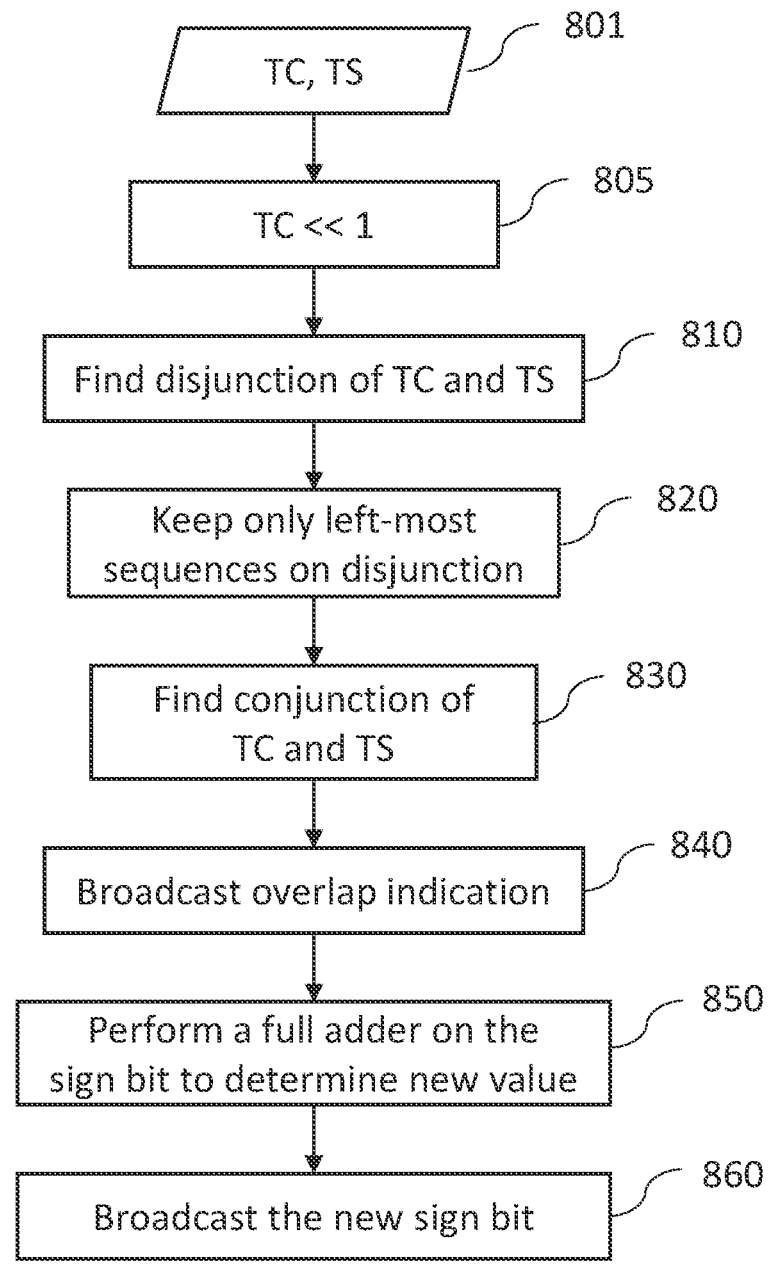
FIG. 8 is a schematic illustration of a flow that may be implemented as microcode by long divider system of FIG. 4 to perform carry prediction.

FIG. 8, to which reference is now made, is a schematic illustration of a flow 800 that may be implemented as microcode by carry predictor 440 (FIG. 4) to perform the carry prediction.

In the flow and the microcode discussed hereinbelow, when used as part of long divider 400, TS is a sum vector and TC is a carry vector, both derived from a carry save operation between two numbers. Vector 1 m is used to isolate operations performed on the sign bit (a value '1' in the column of the sign bit and '0' on all other columns) and vector ~1 m is used to isolate operations performed on the content of the vectors (a value '0' in the column of the sign bit and '1' on all other columns). RL is a vector holding a result of one or more logical operations performed between cells of vectors stored on rows of memory array 410 and RSP includes in all bits the same indication related to the existence of the value '1' in the row. If at least one cell in the row has the value 1 all the bits of RSP will be '1' and '0' otherwise.

Carry predictor 440 may predict the sign of the sum by looking for a sequence of 1's in both vectors starting from the left (a single '1' is considered a sequence) and finding if there is an overlap between sequences in both vectors indicating a carry is expected.

In step 801, flow 800 may receive two vectors, TC and TS, for which it should predict the sign of their sum.

In step 805, vector TC may be shifted one location to the left to simulate potential propagation from remote disconnected sequences (to handle the case illustrated in example 7D).

In step 810, carry predictor 440 may find sequences in TC and TS by computing the disjunction between TS and TC ignoring the sign bit and storing the result in RL (stored in RL 521 of FIG. 5) using for example the following microcode: RL=~(TS|TC|1 m)

In step 820, carry predictor 440 may keep only left most sequence of disjunction by removing remote disconnected sequences that may not impact the carry prediction using for example the following microcode RL=~FFS-logic(RL).

In step 830, carry predictor 440 may perform the conjunction between the two vectors to find if the sequences found in the TS and TC overlap which is indicative of a carry using for example the following microcode: RL=RL&TS&TC&(~1 m). The value '1' in any of the bits of the RL may indicate that a carry will be created.

In step 840, carry predictor 440 may broadcast the carry indication to all bits of RL using for example the following microcode: RL=RSP(RL).

In step 850, carry predictor 440 may perform a full adder operation on the sign bit, to receive the predicted sign of the sum by performing a logical XOR operation between RL (having the carry indication in all its bits) TC and TS using for example the following microcode: RL=(RL^TS^TC)&1 m.

In step 860, carry predictor 440 may broadcast the sign bit to a vector S (all bits of S include the value of the sign bit) using for example the following microcode: S=RSP(RL). The value of all bits of vector S are the same and have the value of the predicted sign bit of the sum.

It may be appreciated that each step in the microcode performed between bits stored in column (between rows) may be performed concurrently on all bits of TC and TS and steps in the microcode performed on all bits of a row may be performed in parallel over all bits thus, the complexity of the entire microcode is O(1).

It may be appreciated that replacing the substitution operation of traditional long division operation with an add operation (of the two's complement) on associative memory array 410 (FIG. 4) where the sum and carry bit-vectors may be calculated by carry save calculator 430 in a complexity of O(1) and the carry may be predicted by carry predictor 440 in a complexity of O(1), may provide an overall long division operation performed in a complexity of O(n) which may be significantly different than the standard complexity of a division operation especially when n (the number of bits in the numerator N) is in the order of thousands (resulting in a complexity of O(n*n)).

It may be appreciated that the steps shown for the exemplary flows herein above are not intended to be limiting and that the flow may be practiced with variations. These variations may include more steps, less step, changing the sequence of steps, skipping steps, among other variations which may be evident to one skilled in the art.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An iterative method for binary division dividing an n-bit numerator by a d-bit denominator on an associative memory device, the method comprising:
   at each iteration, performing on said associative memory device a bit-wise sum and carry operation on a current remainder provided as a sum and a carry and on a two's complement of said d-bit denominator,
   wherein each bit i of said sum, said carry, said remainder, and said two's complement representation of said denominator are stored in a column i of said associative memory device;

predicting a sign bit of a total of said sum and said carry, and updating on said associative memory device said current remainder and a bit of a quotient if said sign bit is positive; and after all iterations are finished, creating on said associative memory device a final remainder from a total of said sum and carry of said current remainder of a last iteration, wherein a number of bits n and d of said numerator and denominator, respectively, are on the order of thousands.

2. A method for binary division on an associative memory device, the method comprising:

having on said associative memory device a current remainder provided as a sum bit-vector and a carry bit-vector;

performing on said associative memory device a carry save add operation between said sum bit-vector and said carry bit-vector and a two's complement representation of a denominator to produce a temporary sum and a temporary carry, wherein each bit i of said sum bit-vector, said carry bit-vector, said current remainder, and said two's complement representation of said denominator are stored in a column i of said associative memory device;

predicting a sign bit of a full total of said temporary sum and said temporary carry; and updating on said associative memory device said current remainder with said temporary sum and said temporary carry and incrementing a quotient if said sign bit is 0.

3. The method of claim 2 also comprising:

also having an index pointing to a most significant bit (MSB) of a numerator;

setting on said associative memory device a least significant bit (LSB) of said sum bit-vector to a value of a bit in a location index of said numerator;

decreasing said index;

repeating said having, performing, predicting, updating and decreasing until said index is pointing to an LSB of said numerator; and creating on said associative memory device a final remainder by adding said temporary sum and said temporary carry.

4. The method of claim 2 wherein said performing said carry save add operation is done concurrently on all bits of said sum bit-vector and said carry bit-vector.

5. The method of claim 2 wherein said predicting comprises:

finding on said associative memory device a first sum sequence of '1's in said temporary sum;

shifting on said associative memory device said temporary carry one location to the left;

finding on said associative memory device a first carry sequence of '1's in said temporary carry; and predicting on said associative memory device a carry if said first sum sequence overlaps said first carry sequence.

6. A long divider system implemented on an associative memory device comprising an associative memory array storing vectors in rows thereof, the long divider system comprising:

a carry save calculator implemented on said associative memory device to receive a remainder in a form of a sum vector and a carry vector stored in said rows, and to perform a carry save add operation between said remainder and a ones" complement representation of a denominator vector to create a temporary sum and a temporary carry, wherein each bit i of said sum vector, said carry vector, said remainder, and said ones' complement representation of said denominator vector are stored in a column i of said associative memory array;

a carry predictor implemented on said associative memory device to predict a sign of a sum of said temporary sum and said temporary carry and to increment a quotient if said sign is 0; and a full adder implemented on said associative memory device to add said temporary sum and said temporary carry to create a final remainder after all bits of a numerator have been processed, wherein a number of bits of said numerator and denominator, respectively, are on the order of thousands.

7. The system of claim 6, said carry save calculator to concurrently activate rows and columns storing bits of said sum vector, said carry vector and said remainder, thereby concurrently compute a plurality of bits comprising said temporary sum and said temporary carry in a computation complexity of O(1).

8. The system of claim 6, said carry predictor to concurrently activate rows storing bits of said temporary sum and said temporary carry and a plurality of columns storing said bits thereby to predict a sign of a total of said temporary sum and said temporary carry in a complexity of O(1).

* * * * *